United States Patent
Cantu' et al.

(10) Patent No.: US 9,434,115 B2
(45) Date of Patent: Sep. 6, 2016

(54) METHOD AND APPARATUS FOR CONTROLLING A MANUFACTURING PROCESS OF COMPONENTS OF A TYRE FOR VEHICLE WHEELS

(75) Inventors: Marco Cantu', Milan (IT); Enrico Sabbatani, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 1015 days.

(21) Appl. No.: 11/791,664

(22) PCT Filed: Dec. 1, 2004

(86) PCT No.: PCT/IT2004/000667
§ 371 (c)(1),
(2), (4) Date: Apr. 3, 2008

(87) PCT Pub. No.: WO2006/059351
PCT Pub. Date: Jun. 8, 2006

(65) Prior Publication Data
US 2008/0269941 A1    Oct. 30, 2008

(51) Int. Cl.
*G06F 19/00* (2011.01)
*B29D 30/14* (2006.01)
(Continued)

(52) U.S. Cl.
CPC ........... *B29D 30/14* (2013.01); *B29D 30/1628* (2013.01); *B29D 30/28* (2013.01); *B29D 30/3028* (2013.01)

(58) Field of Classification Search
USPC ............... 156/110, 110.1, 301; 700/175, 280
See application file for complete search history.

(56) References Cited

U.S. PATENT DOCUMENTS 3,705,516 A * 12/1972 Reis ...................... G01H 1/003
73/659
3,800,893 A *  4/1974 Ramsay et al. ............ 177/25.14
(Continued)

FOREIGN PATENT DOCUMENTS

EP     0 794 420     9/1997
EP     0 928 702     7/1999
(Continued)

OTHER PUBLICATIONS

Ogawa; "Sticking Device for Strip Member", Patent Abstracts of Japan, Publication No. 11077849, Publication Date Mar. 23, 1999.
(Continued)

*Primary Examiner* — Darrin Dunn
(74) *Attorney, Agent, or Firm* — Finnegan, Henderson, Farabow, Garrett & Dunner, L.L.P.

(57) ABSTRACT

A method for controlling a manufacturing process of components of a tire for vehicle wheels, wherein at least one elongated element fed by a dispensing member is distributed onto a forming support by means of at least one pressing member acting on the at least one elongated element along a pressing direction. The method includes the steps of substantially continuously detecting the value of a characteristic quantity indicative of the displacement of the at least one pressing member along the pressing direction, comparing the detected value of the characteristic quantity with a threshold value and generating a warning signal when the detected value of the characteristic quantity exceeds the threshold value. Such a control method allows the presence of possible deposition anomalies to be identified right from the deposition step of the elongated elements on the forming support so as to ensure ever higher quality levels in tires manufactured through continuous processes.

30 Claims, 2 Drawing Sheets

(51) Int. Cl.
  *B29D 30/16* (2006.01)
  *B29D 30/28* (2006.01)
  *B29D 30/30* (2006.01)

(56) References Cited

U.S. PATENT DOCUMENTS

| | | | | |
|---|---|---|---|---|
| 4,023,044 | A * | 5/1977 | Miller | B21D 55/00 307/116 |
| 4,279,683 | A * | 7/1981 | Landsness | 156/397 |
| 4,642,617 | A * | 2/1987 | Thomas et al. | 340/680 |
| 4,718,078 | A * | 1/1988 | Bleidorn | G05B 19/4062 318/563 |
| 4,849,741 | A * | 7/1989 | Thomas | G05B 19/4065 340/680 |
| 4,991,682 | A * | 2/1991 | Kuntz | B60R 21/0132 180/282 |
| 5,125,188 | A * | 6/1992 | Ogawa et al. | 451/5 |
| 5,267,847 | A * | 12/1993 | Bohm et al. | 425/145 |
| 5,364,490 | A * | 11/1994 | Hilke et al. | 156/396 |
| 5,388,629 | A * | 2/1995 | Kami | B22D 17/2236 164/113 |
| 5,483,447 | A * | 1/1996 | Jeenicke | B60R 21/0132 180/274 |
| 5,541,859 | A * | 7/1996 | Inoue et al. | 702/148 |
| 5,659,302 | A * | 8/1997 | Cordier | G01P 1/127 340/665 |
| 5,679,900 | A * | 10/1997 | Smulders | 73/659 |
| 6,084,577 | A * | 7/2000 | Sato et al. | 345/179 |
| 6,129,877 | A * | 10/2000 | Kuc, Sr. | 264/210.2 |
| 6,131,457 | A * | 10/2000 | Sato | 73/514.31 |
| 6,243,076 | B1 | 6/2001 | Hatfield | 345/156 |
| 6,304,828 | B1 * | 10/2001 | Swanick et al. | 702/107 |
| 6,356,856 | B1 * | 3/2002 | Damen et al. | 702/160 |
| 6,389,887 | B1 * | 5/2002 | Dusserre-Telmon et al. | 73/114.77 |
| 6,428,639 | B1 * | 8/2002 | Oldenburg et al. | 156/64 |
| 6,510,019 | B1 * | 1/2003 | DeRosa | 360/78.06 |
| 6,616,783 | B2 * | 9/2003 | Senbokuya et al. | 156/117 |
| 6,666,940 | B2 * | 12/2003 | Martin et al. | 156/117 |
| 6,690,888 | B1 * | 2/2004 | Keller et al. | 398/129 |
| 6,820,026 | B1 * | 11/2004 | Schoch | 702/105 |
| 6,873,918 | B2 * | 3/2005 | Curless et al. | 702/36 |
| 6,889,553 | B2 * | 5/2005 | Robinson et al. | 73/649 |
| 6,923,879 | B1 * | 8/2005 | Blickwedel et al. | 156/117 |
| 7,242,162 | B2 * | 7/2007 | Goth | 318/480 |
| 7,249,287 | B2 * | 7/2007 | Littrell | 714/47.2 |
| 7,261,530 | B2 * | 8/2007 | Mancosu et al. | 425/43 |
| 7,641,752 | B2 * | 1/2010 | Nicolas et al. | 156/130 |
| 2001/0012973 | A1 * | 8/2001 | Wehrli et al. | 700/193 |
| 2001/0020518 | A1 * | 9/2001 | Mayet | 156/397 |
| 2003/0061008 | A1 * | 3/2003 | Smith et al. | 702/188 |
| 2003/0205080 | A1 * | 11/2003 | Shteinhauz et al. | 73/146 |
| 2003/0217592 | A1 * | 11/2003 | Nagaike et al. | 73/104 |
| 2004/0055711 | A1 * | 3/2004 | Martin et al. | 156/397 |
| 2004/0089400 | A1 * | 5/2004 | Vargo et al. | 156/136 |
| 2004/0215092 | A1 * | 10/2004 | Fischell et al. | 600/515 |
| 2004/0222018 | A1 * | 11/2004 | Sullivan et al. | 175/39 |
| 2004/0249249 | A1 * | 12/2004 | Lawson et al. | 600/300 |
| 2005/0183810 | A1 * | 8/2005 | Abe et al. | 156/117 |
| 2005/0189061 | A1 * | 9/2005 | Kudo et al. | 156/117 |
| 2006/0082077 | A1 * | 4/2006 | Gouriet et al. | 280/5.5 |

FOREIGN PATENT DOCUMENTS

| | | |
|---|---|---|
| EP | 0 968 814 | 1/2000 |
| EP | 1 120 232 | 8/2001 |
| EP | 1517781 | 3/2005 |
| EP | 1509386 B1 | 7/2007 |
| JP | 03-002511 | 1/1991 |
| JP | 11-77849 A | 3/1999 |
| JP | 11-132760 | 5/1999 |
| JP | 2002-90136 A | 3/2002 |
| JP | 2004-299184 A | 10/2004 |
| RU | 2 112 653 C1 | 6/1998 |
| WO | WO 93/19929 | 10/1993 |
| WO | WO 01/36185 | 5/2001 |
| WO | WO 03/101713 A1 | 12/2003 |
| WO | WO 2004/041521 | 5/2004 |
| WO | WO 2004/041522 | 5/2004 |

OTHER PUBLICATIONS

Miyazaki; "Method and Device for Inspecting Thickness of Unvulcanized Rubber", Publication No. 2002090136, Publication Date Mar. 27, 2002.
English Translation of Japanese Office Action mailed Jul. 13, 2010 for Japanese Patent Application No. 2007-544017.
English Abstract of JP2004-299184 A.
English Machine Translation of JP2004-299184 A.
Korean Intellectual Property Office, Notice of Preliminary Rejection in Korean Patent Application No. 10-2007-7012276, May 30, 2011, pp. 1-5.
Japan Patent Office, Notice of Reasons for Rejection in Japanese Patent Application No. 2007-544017, May 18, 2011, pp. 1-3.
Office Action, issued by the Government of India Patent Office in corresponding Application No. 3376/DELNP/2007, dated Mar. 12, 2014, 2 pages.

* cited by examiner

METHOD AND APPARATUS FOR CONTROLLING A MANUFACTURING PROCESS OF COMPONENTS OF A TYRE FOR VEHICLE WHEELS

CROSS REFERENCE TO RELATED APPLICATION

This application is a national phase application based on PCT/IT2004/000667 filed Dec. 1, 2004, the content of which is incorporated herein by reference.

BACKGROUND OF THE INVENTION

1. Field of the Invention

The present invention, in a first aspect thereof, refers to a method for controlling a manufacturing process of components of a tyre for vehicle wheels. More specifically, the invention concerns a control method for detecting manufacturing defects in components of a tyre for vehicle wheels made through a process in which elongated elements fed by a dispensing member are distributed onto a forming support by means of at least one pressing member acting on such elongated elements along a pressing direction.

In a second aspect thereof, the present invention refers to an apparatus for the deposition of elongated elements in a manufacturing process of components of a tyre for vehicle wheels suitable for allowing the aforementioned method to be carried out.

2. Description of the Related Art

Throughout the present description and the subsequent claims, the term: elongated element is used to indicate an element in which the longitudinal dimensions are substantially greater than the transversal dimensions and the thickness, said element being made of an elastomeric material possibly comprising one or more thread-like reinforcing elements, such as fabric or metallic cords, incorporated therein.

It is also specified that, in the present description and in the subsequent claims, the term: elastomeric material is used to indicate a composition comprising at least one elastomeric polymer and at least one reinforcing filler. Preferably, such a composition also comprises additives such as, for example, a cross-linking agent and/or a plastifier. Thanks to the presence of the cross-linking agent, such a material can be cross-linked through heating, so as to form the finished product.

A tyre for vehicle wheels generally comprises a carcass structure comprising at least one carcass ply formed of reinforcing cords incorporated in an elastomeric matrix. The carcass ply has end flaps respectively engaged with annular anchoring structures, arranged in the areas usually identified with the name "beads" and each one normally formed of a substantially circumferential annular insert on which at least one filling insert is applied in a radially outer position.

In a radially outer position with respect to the carcass ply a belt structure is provided comprising one or more belt layers arranged radially one on top of the other and having textile or metallic reinforcing cords with crossed orientation and/or with an orientation substantially parallel to the direction of circumferential extension of the tyre. In a radially outer position a tread band, also made from elastomeric material like other structural components forming the tyre, is applied to the belt structure.

Between the tread band and the belt structure a so-called "underlayer" made of elastomeric material with suitable properties for ensuring a steady union of the tread band itself can be arranged.

On the side surfaces of the carcass structure respective sidewalls made of elastomeric material are also applied, each one extending from one of the side edges of the tread band up to the respective annular anchoring structure to the beads.

In tubeless tyres, the carcass ply is internally coated with a layer of a preferably butylene-based elastomeric material, usually known as a "liner", having excellent characteristics of airtightness and extending from one bead to the other.

Conventional manufacturing processes of tyres for vehicle wheels essentially provide that the components of the tyre listed above are first of all made separately from each other and then are assembled in a subsequent tyre manufacturing step.

The current trend is, however, to employ manufacturing processes that allow the production and storage of semi-finished products to be minimised or, possibly, eliminated.

More specifically, attention has now turned towards process solutions that allow the individual components of the tyre to be made by directly applying them, according to a predetermined sequence, onto the tyre being manufactured on a preferably toroidal forming support.

In document WO 01/36185 to the same Applicant, the components of the tyre are formed on a toroidal support by sequentially applying onto the latter a plurality of elongated elements, consisting for example of individual rubberized cords or of rubberized cords grouped in parallel in the form of strip-like elements, particularly used for making the carcass and belt structure, and of continuous elongated elements made of elastomeric material, particularly used for making other structural components of the tyre, such as, for example, tread band, sidewalls, liner and filling inserts.

EP 0 968 814 A2 describes a process and an apparatus for distributing elastomeric materials for tyre-constitutional members. An elastomeric material for a tyre-constitutional member is laid down with high efficiency and high precision on a rotating support by arranging a pair of rollers rotating in opposite direction close to a radially outer surface portion of the support and using a gap defined between the rollers as a roller die.

It should be noted that in these cases the manufacturing of a tyre provides for an automated and substantially continuous process, i.e. substantially without intermediate storage of semi-finished products. In such a process the individual structural components of the tyre described above are manufactured according to a predetermined sequence starting from elongated elements fed by a dispensing member that can be operatively associated with an extruder and thereafter applied onto the forming support by means of at least one pressing member acting on the elongated element along a pressing direction.

A critical factor in continuous manufacturing processes of tyres of the type described above is the identification of anomalies that can intervene or occur during the manufacturing of one of the structural components of the tyre being formed due to an incorrect deposition of the elongated elements on the forming support. In fact, such anomalies cause imperfections or defects that may be hidden by a subsequently applied component and therefore no longer be detected directly on the finished tyre.

Most typical imperfections and/or defects encountered during the deposition step are those deriving from:

breaking of the elongated element with the consequent lack of deposition of the extruded material in the areas subjected to the dispensing cycle;

formation of discontinuities due to the presence of clots in the mix, or of brief mix portions with geometry not corresponding to that expected in output from the dispensing member (that can be caused by the presence of possible burnt portions or by operating anomalies of the dispensing member in operation);

formation of folds of material, particularly in the starting step of the deposition cycle.

The Applicant has therefore felt the need to develop a method that allows the presence of possible defects or imperfections of deposition to be identified right from the deposition step of the aforementioned elongated elements on the forming support, in order to ensure ever higher quality levels in the tyres manufactured through continuous processes of the type described above.

SUMMARY OF THE INVENTION

The Applicant has found that it is possible to identify the presence of such possible defects or imperfections during the deposition step of the elongated element on the forming support by substantially continuously detecting, with a predetermined frequency, the value of a characteristic quantity indicative of the displacement along the pressing direction of a pressing member acting in the deposition of the elongated element, and generating a warning signal when the detected value exceeds a predetermined threshold value.

The present invention therefore concerns, in a first aspect thereof, a method for controlling a manufacturing process of components of a tyre for vehicle wheels, wherein at least one elongated element fed by a dispensing member is distributed onto a forming support by means of at least one pressing member acting on said at least one elongated element along a pressing direction, comprising the steps of:

detecting with a predetermined frequency the value of a characteristic quantity indicative of the displacement of said at least one pressing member along said pressing direction;

comparing the detected value of said characteristic quantity with a threshold value;

generating a warning signal when the detected value of said characteristic quantity exceeds said threshold value.

Throughout the present description and the subsequent claims, the term: pressing direction is used to indicate the direction along which the force that keeps the pressing member pressed against the forming support acts.

Advantageously, the method of the present invention allows the way in which the elongated elements are deposited on the forming support to be monitored by controlling the movements of at least one pressing member acting on the elongated element for the deposition of the latter on the forming support. It is thus possible to simply and reliably detect the presence of possible imperfections or defects on the tyre being formed right from the deposition step of the elongated elements on the forming support, thus allowing the producer to evaluate in real time (or at the end of the deposition process) the quality level of the tyre being formed (or of the finished tyre).

More specifically, during the distribution of the elongated element on the forming support the pressing member is subjected to continuous oscillations along the pressing direction due to the inherent nature of the deposition process. It can be observed that, when deposition takes place correctly, such oscillations remain within a limited range typical of a deposition cycle without deposition anomalies; on the contrary, when deposition anomalies (such as clots in the mix of the extruded material or breaking of the elongated element) occur the pressing member is subjected to impulse forces that determine displacement peaks outside of the aforementioned range. Such displacement peaks are detected as indicative of a deposition anomaly and suitably signalled.

In a preferred embodiment of the method of the present invention, the step of detecting the value of a characteristic quantity representative of the displacement of the pressing member comprises the steps of:

a) generating an analog electric signal indicative of the displacement in time of said at least one pressing member along said pressing direction;

b) processing said analog electric signal to identify a numerical value representative of a parameter of oscillation of said analog electric signal.

Still in the preferred embodiment, the method of the invention further comprises the steps of:

c) comparing said numerical value with said threshold value;

d) generating a warning signal when said numerical value exceeds said threshold value;

e) memorising said warning signal;

f) setting to zero said numerical value;

g) iteratively repeating steps a) to f).

The iteration of steps a) to f) is intended to be repeated for the entire duration of a deposition cycle and allows many deposition anomalies that can subsequently occur during such a cycle to be identified.

Preferably, the method comprises a step of generating an alarm signal when the detected value of said characteristic quantity exceeds said threshold value for a predetermined number of times. Advantageously, such an alarm signal can supply an indication of the quality level of the tyre being manufactured and/or it can be used to generate a command for immediate termination of the deposition cycle in progress.

The maximum number of times the threshold value can be exceeded after which the alarm signal is generated depends on the type and length of the specific deposition cycle under consideration, which depends in turn on the particular structural component of tyre being made. The Applicant has found that a maximum number of times that the threshold value can be exceeded/preferably of between 3 and 6 is sufficient to ensure the manufacture of a high quality tyre.

In a first embodiment of the method of the present invention, said threshold value has a predetermined absolute value. Such a value is also selected based on the type of the specific deposition cycle under consideration.

In a preferred embodiment of the method, said threshold value is calculated with the steps of:

S1) assigning said threshold value an initial value;

S2) detecting a predetermined number of values of said characteristic quantity and evaluating the difference between said values and said threshold value;

S3) calculating an average of the differences obtained in step S2);

S4) updating said threshold value through the value of said average;

S5) iteratively repeating steps S2) to S4).

The iteration of steps S2) to S4) is intended to be repeated for the entire duration of a deposition cycle.

Through the aforementioned calculation method it is advantageously possible to dynamically adapt the value of said threshold value to the specific behaviour of the deposition cycle.

Preferably, the method of the invention further comprises a step of detecting the time instant at which the detected value of said characteristic quantity exceeds said threshold value. Through this further piece of information it is advantageously possible to localise on the finished tyre the defect or imperfection caused by the detected deposition anomaly.

In the preferred embodiment of the method of the present invention, the characteristic quantity indicative of the displacement of the pressing member that is detected is the instantaneous acceleration of such a pressing member along its pressing direction. Such a characteristic quantity is immediately correlated to the displacements of the pressing member and can advantageously be measured in a simple way through conventional accelerometer sensors.

Preferably, in this embodiment and in the case of predetermined threshold value, said threshold value has an absolute value of between about 2 m/s$^2$ and about 5 m/s$^2$.

In an alternate embodiment, the instantaneous acceleration vector of the pressing member is detected. This can be obtained by measuring the instantaneous accelerations of the pressing member in three perpendicular spatial directions, one of which coincides with the aforementioned pressing direction.

In an embodiment thereof, the method of the present invention can be used in a manufacturing process of components of a tyre (such as tread band, bead filling inserts, sidewalls, sidewall inserts, liner, underliner, antiabrasive inserts, underbelt insert, underlayer of the tread band) that require the deposition of elongated elements consisting entirely of elastomeric material. Preferably, in this case, the elongated element is continuously fed by said dispensing member in the form of an extruder.

Preferably, the volumetric flow rate values of said extruder are between about 2 cm$^3$/s and about 35 cm$^3$/s, more preferably between about 5 cm$^3$/s and about 25 cm$^3$/s.

In this embodiment, the step of detecting the value of said characteristic quantity is carried out with a predetermined sampling frequency preferably between about 100 Hz and about 2000 Hz, more preferably between about 500 Hz and about 1000 Hz.

In another embodiment thereof, the method of the present invention can be used in a manufacturing process of components of a tyre (such as the carcass structure and the belt structure) that require the deposition of elongated elements consisting of elastomeric material comprising one or more thread-like reinforcing elements incorporated therein. Preferably, in this case, the elongated element fed by said dispensing member is cut to size in pieces of predetermined length before being distributed on the forming support.

In this embodiment, the step of detecting the value of said characteristic quantity is carried out with a predetermined sampling frequency preferably between about 500 Hz and about 3000 Hz, more preferably between about 1000 Hz and about 2000 Hz.

According to a second aspect thereof, the present invention concerns an apparatus for depositing at least one elongated element onto a forming support in a manufacturing process of components of a tyre for vehicle wheels, comprising:

- a dispensing member arranged adjacently to the forming support and adapted to feed said at least one elongated element onto the forming support;
- at least one support element associated with the dispensing member;
- at least one device adapted to push said at least one support element against the forming support along a pressing direction;
- at least one pressing member integrally associated with said at least one support element at a free end thereof and adapted to distribute said at least one elongated element onto the forming support;
- a detecting device of a characteristic quantity indicative of the displacement of said at least one pressing member along the pressing direction during the deposition of said at least one elongated element onto said forming support.

Advantageously, such an apparatus allows the control method discussed above to be carried out.

Preferably, the detecting device comprises a device for generating an electric signal indicative of the displacement of said at least one pressing member along said pressing direction and a device for processing said electric signal.

In a preferred embodiment, said device for generating an electric signal is an accelerometer.

In a further preferred embodiment, said device for generating an electric signal is a position sensor operatively associated with a device suitable for carrying out the second derivative of the quantity detected by said position sensor.

Still in a preferred embodiment, said device for processing said electric signal comprises a peak-to-peak detector. Such a detector, in particular, is able to detect when the electric signal generated by the accelerometer (or its second derivative if the electric signal is generated by the position sensor) exceeds a threshold value and to generate a suitable signal each time this occurs.

Preferably, said at least one pressing member is a rolling pressing member, so as to make easier the relative motion between pressing member and forming support during the deposition of the elongated element onto the forming support.

Preferably, the dispensing member comprises an extrusion head that advantageously allows an elongated element consisting at least in part of elastomeric material with the desired shape and size to be dispensed.

In the case where the deposition process requires it, the aforementioned apparatus preferably further comprises a cutting member for cutting to size pieces of said elongated element and a pair of pressing members that can move apart from each other to apply said pieces on the forming support.

Preferably, in particular in the manufacturing processes of tyres carried out continuously described above, the forming support is a toroidal support, more preferably a substantially rigid toroidal support.

Alternatively, said forming support can be a cylindrical support. Such a shape of the support can be useful for making some structural components of the tyre (like the belt structure of the tread band) in manufacturing processes of tyres wherein the different structural components of the tyre are separately formed on many forming supports and subsequently assembled to obtain the finished tyre.

Preferably, said detecting device is operatively associated with a control unit of the aforementioned dispensing member.

Preferably, said control unit is operatively associated with a control system of the manufacturing process of the aforementioned tyre.

BRIEF DESCRIPTION OF THE DRAWINGS

Further characteristics and advantages of the present invention shall become clearer from the following detailed description of some embodiments thereof, made with reference to the attached drawings. In such drawings.

DETAILED DESCRIPTION OF THE INVENTION

Figure 1:
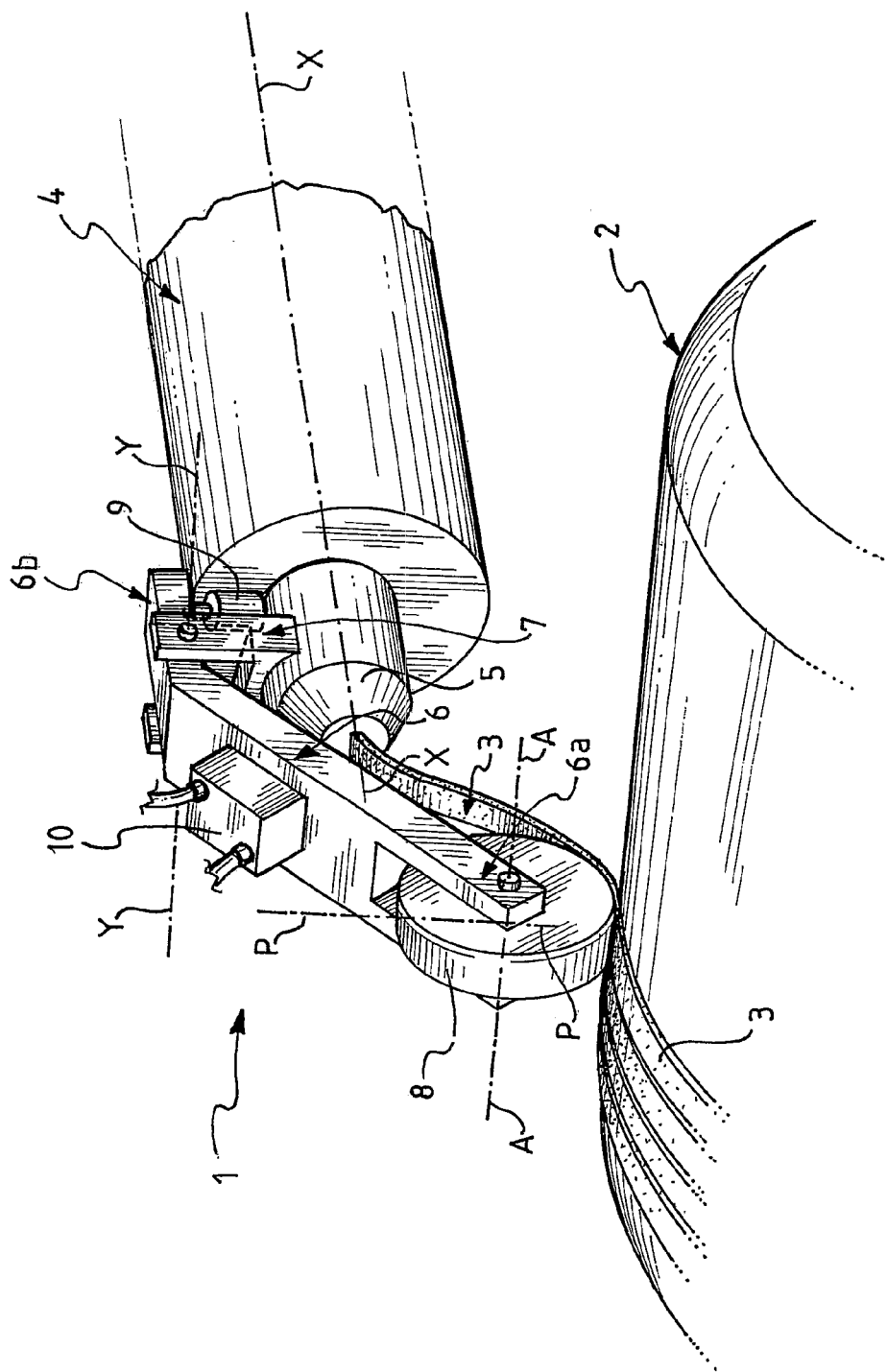
FIG. 1 is a schematic perspective view of a preferred embodiment of an apparatus adapted to allow the method of the invention to be carried out.

With reference to FIG. 1, an apparatus for depositing an elongated element 3 on a forming support 2 in a manufacturing process of components of a tyre for vehicle wheels according to a preferred embodiment of the present invention is globally indicated with 1.

The apparatus 1 is part of a work station of the type described in the above-mentioned document WO 01/36185 to the same Applicant.

The apparatus 1 comprises an extruder 4 (only partially shown) extending along a longitudinal axis X-X and equipped with an extrusion head 5 adapted to dispense the elongated element 3. The extruder 4 and the extrusion head 5 are, for example, of the type described in the above-mentioned document WO 01/36185.

The extrusion head 5 can allow the dispensing of a elongated element 3 consisting entirely of elastomeric material, like in the case of the manufacturing of components of a tyre made of elastomeric material, such as the tread band, bead filling inserts, sidewalls, liners, sidewall inserts, underliner, antiabrasive inserts, underbelt insert, underlayer of the tread band. In this case, the elongated element 3 is typically continuously fed by the aforementioned extruder 4, which preferably maintains a flow rate of between about 2 $cm^3/s$ and about 35 $cm^3/s$, more preferably between about 5 $cm^3/s$ and about 25 $cm^3/s$. Said values control the rotation speed of the aforementioned forming support 2 (in the form of a substantially toroidal or cylindrical drum) preferably below about 110 rpm and more preferably between about 60 rpm and about 80 rpm.

Alternatively, the extrusion head 5 can allow, through suitable devices (not illustrated) operatively associated therewith, as illustrated in patent EP 0 928 702 B1 to the same Applicant, the dispensing of a elongated element 3 consisting of elastomeric material comprising one or more thread-like textile or metallic reinforcing elements incorporated therein, such as in the case of the manufacturing of the belt structure or of the carcass of the tyre. In this case, the elongated element 3, once made, is typically cut to size into pieces of predetermined length before being distributed on the forming support 2, for example through a pair of pressing members which are movable apart from each other.

In manufacturing processes of tyres carried out continuously, wherein the individual components in the tyre are made directly on the forming support, this last is typically a substantially rigid toroidal support as illustrated in the above-mentioned documents WO 01/36185 and EP 0 928 702 B1. Alternatively, in manufacturing processes of tyres wherein the different structural components of the tyre are separately made on many forming supports and subsequently assembled to obtain the finished tyre, the forming support can also be a substantially toroidal or cylindrical support as respectively illustrated in documents WO 04/041522 and WO 04/041521 to the same Applicant.

According to the embodiment of the present invention illustrated here, the apparatus 1 comprises a support element, illustrated here as an arm 6 hinged to the extruder 4 along a pin axis Y-Y defined at a fork element 7 associated with the extrusion head 5.

The arm 6 comprises a first free end portion 6a shaped like a fork and a second free end portion 6b. In the assembled configuration, the end portions 6a and 6b are positioned at opposite sides with respect to the pin axis Y-Y.

A wheel 8 is pivotally mounted to the forked free end portion 6a of the arm 6 along a respective pin axis A-A. The wheel 8 acts as a pressing member for distributing the elongated element 3 on the forming support 2. In order to push the arm 6 and the wheel 8 against the forming support 2, the apparatus of the present invention comprises a device 9 mounted on the extrusion head 5 and acting on the free end portion 6b of the arm 6. The device 9 keeps the free end 6a of the arm 6, and therefore the wheel 8, pressed against the forming support 2 along a pressing direction P (which, in the specific case of the embodiment illustrated in FIG. 1, corresponds with the direction of the tangent to the arc of circumference traveled by the arm 6 about the pin axis Y-Y).

In the embodiment illustrated in FIG. 1, the device 9 comprises a pneumatic cylinder; in alternative embodiments that are not illustrated, the device 9 may comprise a compression spring, a hydraulic cylinder or other convenient means, all within the reach of the man skilled in the art, suitable for keeping the wheel 8 pressed against the forming support 2.

A detecting device 10 of a characteristic quantity indicative of the displacement of the wheel 8 along the pressing direction P during the deposition of the elongated element 3 on the forming support 2 is mounted on the arm 6.

Figure 2:
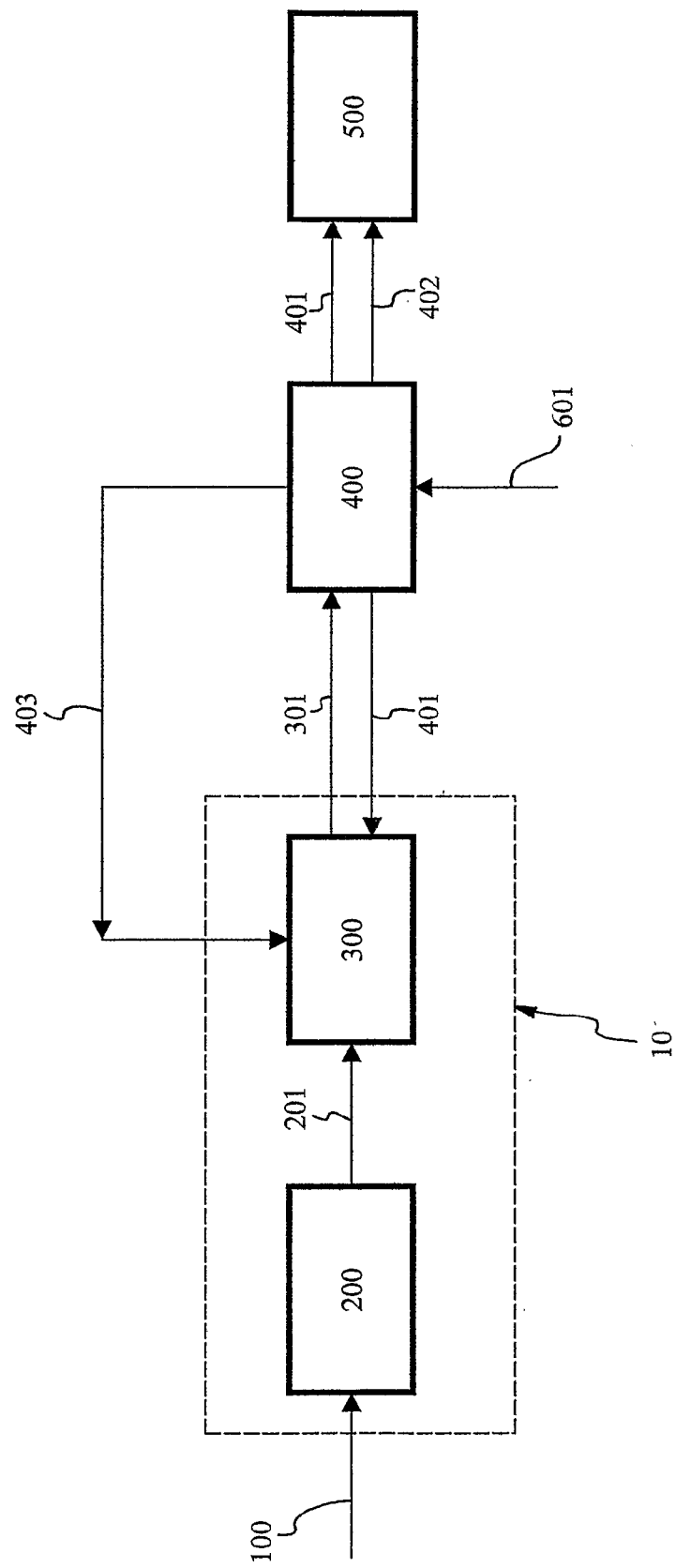
FIG. 2 is a block diagram of a preferred embodiment of the method of the present invention.

FIG. 2 shows a preferred embodiment of the detecting device 10. It can be noted that the detecting device 10 comprises a device 200 for generating an electric signal indicative of the displacement of the wheel 8 along the pressing direction P and a device 300 for processing such an electric signal. In particular, in the preferred embodiment of the detecting device 10, the device 200 is an accelerometer and the processing device 300 is a peak-to-peak detector. Therefore, the characteristic quantity detected by the detecting device 10 is the instantaneous acceleration (indicated by the line 100 in FIG. 2) of the wheel 8 in the pressing direction P. Such acceleration 100 is acquired by the device 200 that generates an analog electric signal (line 201 in FIG. 2) representative of such an acceleration. The analog electric signal 201 is subsequently processed by the processing device 300, which can generate a digital signal (line 301 in FIG. 2) in output from the detecting device 10 that can be sent to a control unit (block 400 in FIG. 2) of the extruder 4. The provision of the detecting device 10 allows a controlling method suitable for identifying possible anomalies that intervene or occur during the manufacturing process of a component of a tyre due to an incorrect deposition of the elongated element 3 on the forming support 2 to be carried out.

In a different embodiment of the apparatus according to the invention, the device 200 is a position sensor of the wheel 8 in the pressing direction P, operatively associated with a device capable of obtaining the second derivative of the characteristic quantity detected, i.e. also in this variant embodiment the instantaneous acceleration of the aforementioned wheel 8. In such a way the peak-to-peak detector and the devices downstream of the detecting device 10, as illustrated above and hereafter, remain unchanged in structure and in operation.

The ways of deposition of the elongated element 3 on the forming support 2 are, for example, illustrated in the above-mentioned documents WO 01/36185, EP 0 928 702 B1, WO 04/041522 and WO 04/041521. Hereafter, the control method carried out through the device 10 discussed above is described in detail; such a method is schematised in FIG. 2 and refers to an aspect of the invention described and claimed here.

The control method of the present invention firstly comprises the step of substantially continuously detecting, i.e. through a predetermined sampling frequency (typically no less than 100 Hz), the instantaneous acceleration 100 of the wheel 8 along the pressing direction P, preferably through the accelerometer 200; the accelerometer 200 converts the detected instantaneous acceleration 100 into the analog electric signal 201.

Thereafter, a step of processing the analog electric signal 201 through the peak-to-peak detector 300 is provided to identify a numerical value representative of the oscillation amplitude of the instantaneous acceleration 100 of the wheel 8 along the pressing direction P.

In a subsequent step sand again through the peak-to-peak detector 300, the numerical value representative of the oscillation amplitude of the instantaneous acceleration 100 is compared with a threshold value (line 403 in FIG. 2) supplied in input to the peak-to-peak detector 300. Each time the aforementioned numerical value exceeds the threshold value 403, the peak-to-peak detector 300 generates in output a digital signal (line 301 in FIG. 2) of exceeded threshold value, which is acquired by the control unit 400 of the extruder 4.

In a subsequent step, the control unit 400 of the extruder 4 processes the digital signal 301 of exceeded threshold value to generate a warning signal (line 401 in FIG. 2) that is sent to a suitable human interface device, for example a video terminal, and/or to a control system of the manufacturing process of the tyre (globally indicated by block 500 in FIG. 2). The control unit 400 memorises an exceeded threshold value event and sends a digital reset signal to the peak-to-peak detector 300 (line 404 in FIG. 2). Following the reset signal 404 the peak-to-peak detector 300 set to zero the numerical value representative of the oscillation amplitude of the instantaneous acceleration previously measured (which had given rise to the threshold value 403 being exceeded) so as to be able to detect another possible event of exceeded threshold value 403.

As input to the control unit 400, a maximum number of times the threshold value 403 can be exceeded during a deposition cycle of the elongated element 3 on the forming support 2 is also supplied (line 601 in FIG. 2). Such a maximum number of times 601 is predetermined on the basis of the type and/or duration of the deposition cycle, variable according to the component of the tyre produced in that cycle, and it is preferably between 3 and 6. When the exceeded threshold value events memorised by the control unit 400 exceeds the maximum number 601, the control unit 400 generates, in addition or as an alternative to the warning signal 401, an alarm signal (line 402 in FIG. 2). The alarm signal 402 is also sent to the human interface device and/or control system of the manufacturing process of the tyre 500, to provide an indication on the quality level of the tyre being manufactured and/or to be used to generate an immediate interruption command of the deposition cycle in progress.

Also after the generation of an alarm signal 402 that does not determine an immediate interruption of the deposition cycle in progress, the control unit 400 generates a reset signal 404 for the peak-to-peak detector 300, as already described above with reference to the generation of the warning signal 401.

In the preferred embodiment described here, the method of the invention also comprises a step of detecting the time instants at which the peak-to-peak detector 300 detects that the aforementioned numerical value representative of the oscillation amplitude of the instantaneous acceleration 100 exceeds the threshold value 403. Such detection is preferably carried out by the control unit 400 each time it receives a signal 301 that the threshold value has been exceeded from the peak-to-peak detector 300.

In the preferred embodiment of the method, schematised in FIG. 2, the threshold value 403 is dynamically adapted to the progression of the deposition cycle and is calculated by the control unit 400 with a mobile averages method comprising the following steps:

S1) assigning the threshold value 403 an initial value;
S2) detecting a predetermined number of numerical values representative of the oscillation amplitude of the instantaneous acceleration 100 and evaluating the difference or deviation of these values with respect to the current threshold value 403;
S3) calculating an average of the differences obtained in step S2);
S4) updating the current threshold value 403 through the value of said average;
S5) iteratively repeating steps S2) to S4).

The iteration of steps S2) to S4) is intended to be repeated for the entire duration of a deposition cycle. The number of detections carried out in, step S1) before calculating a new average and updating the current threshold value 403 is preferably between about 10 and about 100, more preferably between about 20 and about 50.

In a different embodiment, the threshold value 403 can be a constant value during each deposition cycle, predetermined, for example, on the basis of the type of component of the tyre that has to be manufactured through such a deposition cycle, and preferably, in absolute value, between about 2 m/s$^2$ and about 5 m/s$^2$.

The control method of the present invention is adapted to be applied to both manufacturing processes in which the elongated element 3 is fed by the extrusion head 5 and distributed on the forming support 2 continuously (FIG. 1), and manufacturing processes (not illustrated) in which the elongated element 3 fed by the extrusion head 5 is associated with thread-like reinforcing elements and then cut to size into pieces of predetermined length before being distributed on the forming support 2, as illustrated in the aforementioned patent EP 0 928 702 B1 to the Applicant.

In the first case the sampling frequency for carrying out a substantially continuous detection of the instantaneous acceleration 100 of the wheel 8 along the pressing direction P has a lower limit determined by the typical volumetric extrusion flow rates of the elongated element 3 and by the rotation speed of the forming support 2 previously illustrated. Such a sampling frequency is preferably between about 100 Hz and about 2000 Hz, more preferably between about 500 Hz and about 1000 Hz.

In the second case the aforementioned sampling frequency for carrying out a substantially continuous detection of the instantaneous acceleration of the pressing members used for the distribution of each piece on the forming support has a lower limit determined by the vertical descending speed following each cut of such pressing members towards the forming support 2, and is preferably between about 500 Hz and about 3000 Hz, more preferably between about 1000 Hz and about 2000 Hz.

The invention claimed is:
1. A method for controlling a manufacturing process of components of a tyre for vehicle wheels, wherein at least one elongated element fed by a dispensing member is distributed onto a forming support by means of at least one pressing member acting on said at least one elongated element along a pressing direction, comprising the steps of:

detecting with a predetermined frequency the value of a characteristic quantity indicative of the position of said at least one pressing member along said pressing direction;

comparing the detected value of said characteristic quantity with a threshold value; and generating a warning signal when the detected value of said characteristic quantity exceeds said threshold value, including generating a warning signal in response to a single acceleration of the pressing member in excess of a threshold value indicating more movement of the pressing member than desired.

2. The method according to claim 1, wherein the step of detecting said value of said characteristic quantity comprises the steps of:

(a) generating an analog electric signal indicative of the position in time of said at least one pressing member along said pressing direction; and (b) processing said analog electric signal to identify a numerical value representative of a parameter of oscillation of said analog electric signal.

3. The method according to claim 2, further comprising the steps of:

(c) comparing said numerical value with said threshold value;

(d) generating a warning signal when said numerical value exceeds said threshold value;

(e) memorising said warning signal;

(f) setting to zero said numerical value; and (g) iteratively repeating steps a) to f).

4. The method according to claim 1, comprising the step of generating an alarm signal when said detected value of said characteristic quantity exceeds said threshold value for a predetermined number of times.

5. The method according to claim 1, wherein said threshold value has a predetermined absolute value.

6. The method according to claim 1, wherein said threshold value is calculated by the steps of:

S1) assigning said threshold value an initial value;

S2) detecting a predetermined number of values of said characteristic quantity and evaluating the difference between said values and said threshold value;

S3) calculating an average of the differences obtained in step S2;

S4) updating said threshold value through the value of said average; and

S5) iteratively repeating steps S2) to S4).

7. The method according to claim 1, further comprising a step of detecting a time instant at which said detected value of said characteristic quantity exceeds said threshold value.

8. The method according to claim 1, wherein said characteristic quantity is the instantaneous acceleration of said at least one pressing member along said pressing direction.

9. The method according to claim 8, wherein said threshold value has an absolute value of about 2 m/s$^2$ to about 5 m/s$^2$.

10. The method according to claim 1, wherein said at least one elongated element comprises elastomeric material.

11. The method according to claim 10, wherein said dispensing member comprises an extruder that continuously feeds said elongated element with a volumetric flow rate of about 2 cm$^3$/s to about 35 cm$^3$/s.

12. The method according to claim 11, wherein said volumetric flow rate is about 5 cm$^3$/s to about 25 cm$^3$/s.

13. The method according to claim 10, wherein said step of detecting said value of said characteristic quantity is carried out with a predetermined frequency of about 100 Hz to about 2000 Hz.

14. The method according to claim 13, wherein said step of detecting said value of said characteristic quantity is carried out with a predetermined frequency of about 500 Hz to about 1000 Hz.

15. The method according to claim 1, wherein said at least one elongated element comprises elastomeric material comprising one or more thread-like reinforcing elements incorporated therein.

16. The method according to claim 15, wherein said elongated element fed by said dispensing member is cut to size into pieces of predetermined length before being applied on said forming support.

17. The method according to claim 16, wherein said step of detecting said value of said characteristic quantity is carried out with a predetermined frequency of about 500 Hz to about 3000 Hz.

18. The method according to claim 17, wherein said step of detecting said value of said characteristic quantity is carried out with a predetermined frequency of about 1000 Hz to about 2000 Hz.

19. An apparatus for depositing at least one elongated element onto a forming support in a manufacturing process of components of a tyre for vehicle wheels, comprising:

a dispensing member arranged adjacently to said forming support and adapted to feed said at least one elongated element onto said forming support;

at least one support element associated with said dispensing member;

at least one device adapted to push said at least one support element against said forming support along a pressing direction;

at least one pressing member integrally associated with said at least one support element at a free end thereof and adapted to distribute said at least one elongated element onto said forming support;

a detecting device of a characteristic quantity indicative of the position of said at least one pressing member along said pressing direction during the deposition of said at least one elongated element onto said forming support;

wherein said detecting device comprises a device for generating an electric signal indicative of the position of said at least one pressing member along said pressing direction and a device for processing said electric signal; and wherein said device for processing said electric signal is configured to generate a warning signal in response to a single acceleration of the pressing member in excess of a threshold value indicating more movement of the pressing member than desired.

20. The apparatus according to claim 19, wherein said device for generating an electric signal is an accelerometer.

21. The apparatus according to claim 19, wherein said device for generating an electric signal comprises a position sensor operatively associated with a device suitable for carrying out the second derivative of the quantity detected by said position sensor.

22. The apparatus according to claim 19, wherein said device for processing said electric signal comprises a peak-to-peak detector.

23. The apparatus according to claim 19, wherein said at least one pressing member is a rolling pressing member.

24. The apparatus according to claim 19, wherein said dispensing member comprises an extrusion head.

25. The apparatus according to claim 19, further comprising a cutting member for cutting to size pieces of said elongated element and a pair of pressing members that can move apart from each other to apply said pieces on said forming support.

26. The apparatus according to claim 19, wherein said forming support is a toroidal support.

27. The apparatus according to claim 26, wherein said toroidal support is substantially rigid.

28. The apparatus according to claim 19, wherein said forming support is a cylindrical support.

29. The apparatus according to claim 19, wherein said detecting device is operatively associated with a control unit of said dispensing member.

30. The apparatus according to claim 29, wherein said control unit is operatively associated with a control system of the manufacturing process of said tyre.

* * * * *